United States Patent
Chang et al.

(10) Patent No.: US 7,095,415 B2
(45) Date of Patent: Aug. 22, 2006

(54) GRAPHICS DISPLAY ARCHITECTURE AND CONTROL CHIP SET THEREOF

(75) Inventors: Nai-Shung Chang, Taipei Hsien (TW); Chia-Hsing Yu, Taipei Hsien (TW); Lin Yang, Taipei Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 4 days.

(21) Appl. No.: 10/710,095

(22) Filed: Jun. 18, 2004

(65) Prior Publication Data

US 2005/0017980 A1 Jan. 27, 2005

(30) Foreign Application Priority Data

Jul. 25, 2003 (TW) .............................. 92120368 A

(51) Int. Cl.
*G06F 13/14* (2006.01)
*G06F 15/00* (2006.01)
*G06F 15/16* (2006.01)

(52) U.S. Cl. .................... 345/520; 345/501; 345/502
(58) Field of Classification Search ................ 345/520, 345/501, 502; 710/1, 14
See application file for complete search history.

(56) References Cited

U.S. PATENT DOCUMENTS 6,678,780 B1 * 1/2004 Caruk et al. ................ 710/306
6,724,389 B1 * 4/2004 Wilen et al. ................ 345/520
6,832,269 B1 * 12/2004 Huang et al. ................ 710/11
6,874,042 B1 * 3/2005 Sauber ........................ 710/38

OTHER PUBLICATIONS

"LVDS," http://www.webopedia.com/TERM/L/LVDS.html.*
"DVI," http://www.webopedia.com/TERM/D/DVI.html.*
"Multiplexer," http://en.wikipedia.org/wiki/Multiplexer.*

* cited by examiner

*Primary Examiner*—Ulka Chauhan
*Assistant Examiner*—Joni Hsu
(74) *Attorney, Agent, or Firm*—Jiang Chyun IP Office

(57) ABSTRACT

The graphics display architecture provided by the present invention comprises an AGP slot, a PCIE slot, and a control chip set. The control chip set comprises a plurality of multi-defined pins, which are electrically coupled to the first pins of the AGP slot and the second pins of the PCIE slot simultaneously. When the first graphics adapter is plugged in the AGP slot and the first graphics adapter complies with AGP interface specification, the multi-defined pins serve to send/receive the signal complied with AGP interface specification. When the first graphics adapter is plugged in the AGP slot and the first graphics adapter complies with the Gfx interface, the multi-defined pins serve to send/receive the signal complied with the Gfx interface. When the second graphics adapter is plugged in the PCIE slot, the multi-defined pins serve to send/receive the signal complied wit the PCIE interface specification.

19 Claims, 3 Drawing Sheets

GRAPHICS DISPLAY ARCHITECTURE AND CONTROL CHIP SET THEREOF

CROSS REFERENCE TO RELATED APPLICATIONS

This application claims the priority benefit of Taiwan application serial no. 92120368, filed Jul. 25, 2003.

BACKGROUND OF INVENTION

1. Field of Invention

The present invention relates to a graphics display circuit architecture, and more particularly, to a graphics display circuit architecture in the computer motherboard and a control chip set therein.

2. Description of Related Art

Besides pursuing improvement in computing capability, high speed graphics function is also a major target for computer system developers. 3D-graphics technique, which requires a great amount of data transmission and prompt interaction, has become broadly adopted, yet entire system performance is degraded thereby. In order to cope with congestion problem incurred at input/output of the system in prior art, a so-called Accelerated Graphics Port (or AGP) interface specification is introduced to directly link graphics chip and control chip set on a motherboard in the industry. The present AGP comprises a variety of operating modes including 1× mode, 2× mode, 4× mode, and 8× mode for transferring data between the graphics chip and the control chip set therein.

In addition, for the control chip set applying to a current computer motherboard, a variety of bus interface specifications is introduced for the north bridge chip and the south bridge chip connecting bus. Wherein conventional Peripheral Component Interconnection (or PCI) bus, Hyper Transport (or HT) bus, VLINK bus (VLINK bus is developed by VIA Technologies, Inc.), and Peripheral Component Interconnection Express (or PCIE) bus are included. Owing to excellent performance, PCIE bus is commonly used in the graphics display circuit architecture on a computer motherboard.

In current graphics display circuit architecture, a plurality of interface specifications are developed for different purposes. For example, conventional analog signal interface for Cathode Ray Tube (CRT) screen; FD interface for Liquid Crystal Display (LCD) screen in a notebook computer; TV input/output interface for image capture; TMDS interface for long distance transmission; Low Voltage Differential Signaling (or LVDS) interface; or Digital Visual Interface (or DVI). Notice that all the foregoing interfaces above are commonly referred as Graphics (or Gfx) interface.

FIG. 1A is a schematic view of a conventional graphics display architecture on a Personal Computer (PC) motherboard. Referring to FIG. 1A, the control chip set 110 is electrically coupled to an 8× mode AGP 8× slot 115, and a graphics adapter (not shown) is plugged in the AGP 8× slot 115. The control chip set 110 controls the graphics adapter to display via the AGP 8× slot with data and control signals complying with AGP 8×-interface specification. FIG. 1B is a schematic view of another conventional graphics display architecture on a PC motherboard. Referring to FIG. 1B, the control chip set 120 is electrically coupled to a PCIE slot 125, and a graphics adapter (not shown) is plugged in the PCIE slot 125. FIG. 1C is a schematic view of yet another conventional graphics display architecture on a PC motherboard. Referring to FIG. 1C, the control chip set 130 is electrically coupled to a graphics interface 135 with the Gfx interface. Optionally, the control chip set 130 can be coupled to an expansion slot 145, whereas a graphics adapter (not shown) with Gfx interface graphics chip is plugged in the expansion slot 145.

As to the conventional graphics display architecture illustrated in FIG. 1A, 1B, and 1C, each interface has a corresponding control chip set and a corresponding slot with different specification, which causes a great inconvenience in circuit design, version control, and inventory control. Despite that it is feasible to optionally generate a display signal via the control chipset or via an external display adapter complying with AGP slot, it does not fulfill PCIE interface requirement quite yet. Thus, an integrated all-in-one interface specification that complies with PCIE, AGP, and Gfx is in great demand, whereas circuit layout and circuit design require to be simplified in order to avoid complication of motherboard design and manufacture processes.

SUMMARY OF INVENTION

In light of the preface, it is a primary object to provide a graphics display architecture and a control chip set thereof for supporting PCIE interface specification, AGP interface specification, and Gfx interface, in order to eliminate inconvenience to circuit design, version control, and inventory control in the present invention.

The graphics display architecture provided by the present invention comprises an AGP slot, a PCIE slot, and a control chip set. The AGP slot comprises a plurality of first pins for plugging in a first graphics adapter, wherein the first graphics adapter complies with AGP interface specification or supports Gfx interface. The PCIE slot comprises a plurality of second pins for plugging in a second graphics adapter, wherein the second graphics adapter complies with PCIE interface specification. The control chip set comprises a plurality of multi-defined pins, which are electrically coupled to the first pins of the AGP slot and the second pins of the PCIE slot simultaneously. When the first graphics adapter is plugged in the AGP slot and the first graphics adapter complies with AGP interface specification, the multi-defined pins serve to send/receive the signal complied with AGP interface specification. When the first graphics adapter is plugged in the AGP slot and the first graphics adapter complies with the Gfx interface, the multi-defined pins serve to send/receive the signal complied with the Gfx interface. When the second graphics adapter is plugged in the PCIE slot, the multi-defined pins serve to send/receive the signal complied wit the PCIE interface specification.

In accordance with a preferred embodiment in the presenttemptemp invention, the control chip set connects to the AGP slot and the PCIE slot via a shared bus, whereas the AGP slot of the graphics display architecture is located closer to the control chip set than the PCIE slot. In accordance with another preferred embodiment of the present invention, the graphics display architecture further comprises a switch set, which is coupled to the second pin of the PCIE slot at one end, and is coupled to the first pin of the AGP slot at the other end. As to relative location of the electrical connection, the arrangement follows a sequence of the control chip set, the PCIE slot, the switch set, and the AGP slot, so that the PCIE slot is located closer to the control chip set than the AGP slot to the control chip set.

Another aspect of the present invention provides a graphics display architecture, where the AGP slot is not required to support both interface specifications. It is considered to be within the scope of the present invention that as long as the AGP slot either complies with AGP interface specification or supports the Gfx interface, or even supports other relevant interface specification to graphics display. Accordingly, the control chip set should support both the PCIE interface specification as well as another type of interface specification.

The control chip set provided by the present invention is applicable to graphics display architecture mentioned above. The control chip set comprises an AGP core circuit, a PCIE core circuit, a Gfx core circuit, a plurality of multi-defined pins, and a multiplexor/demultiplexor. The AGP core circuit serves to control and send/receive the signal complied with AGP interface specification, and the PCIE core circuit serves to control and send/receive the signal complied with PCIE interface specification. Similarly, the Gfx core circuit serves to control and send/receive the signal complied with Gfx interface specification. The multiplexor/demultiplexor that is coupling to the AGP core circuit, the PCIE core circuit, the Gfx core circuit, and the multi-defined pins manages to select one of the signals provided by the three preceding core circuits for the multi-defined pins designated by a selecting signal.

The control chip set of the present invention uses a plurality of multi-defined pins to support all of AGP interface specification, PCIE interface specification, and Gfx interface. In the graphics display architecture of the present invention, the multi-defined pins are electrically coupled to the AGP slot and the PCIE slot simultaneously, in order to support multiple interface specifications of graphics display on a single motherboard. Accordingly, the present invention simplifies circuit design as well as eliminates complication of version control and inventory control.

These and other objects, features and advantages of the present invention will become apparent from the following detailed description of illustrative embodiments thereof, which is to be read in connection with the accompanying drawings. Wherein a device is "connected" or "coupled" to another device, it substantially indicates a direct connection or a coupling to another device, or a probable device in between. On the contrary, a device is "directly connected" or "directly coupled" to another device in the following description, there is no medium device indicated.

DETAILED DESCRIPTION

The present invention discloses a graphics display architecture in a computer motherboard and a control chip set therein. The graphics display architecture is electrically coupled to an AGP slot and a PCIE slot via a shared bus by a control chip set. When the graphics adapter is plugged in one of the slots, the other slot is disabled, and the control chip set generates graphics display signals according to the interface specification of the graphics adapter.

The present invention discloses a control chip set supporting multiple graphics display interfaces. The control chip set comprises a plurality of graphics-display-control core circuits, and a multiplexor for selectively propagating a graphic display signal from one of the graphics display control core circuits. The control chip set uses a shared bus to connect to at least two slots, which supports AGP display adapter and PCIE display adapter respectively without deploying two circuit layouts or buses for supporting two display adapter slots.

Figure 1A:
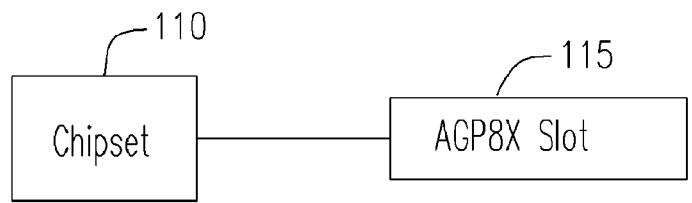
FIG. 1A is a schematic view of a conventional graphics display architecture in a PC motherboard.
Figure 1B:
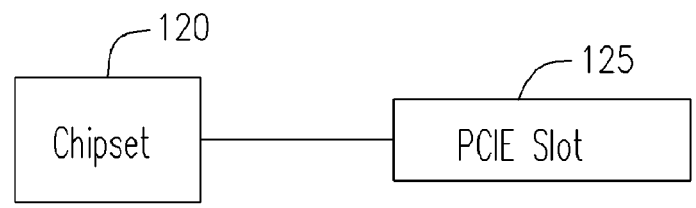
FIG. 1B is a schematic view of another conventional graphics display architecture in a PC motherboard.
Figure 1C:
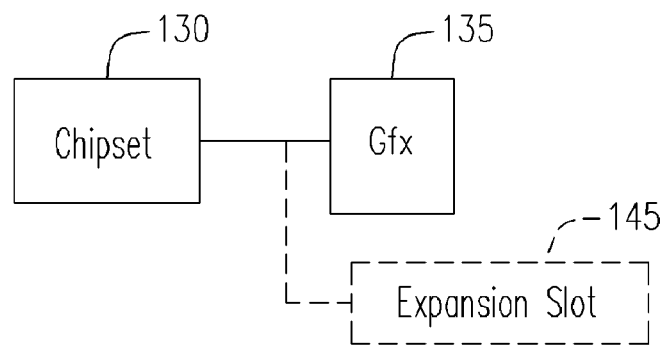
FIG. 1C is a schematic view of yet another conventional graphics display architecture in a PC motherboard.
Figure 2:
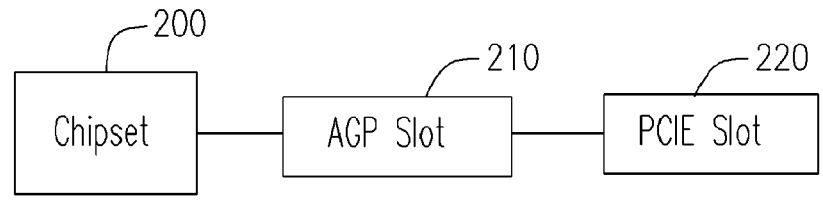
FIG. 2 is a schematic view of a graphics display architecture in the PC motherboard of one preferred embodiment according to the present invention.

FIG. 2 is a schematic view of a graphics display architecture in the PC motherboard of a preferred embodiment according to the present invention. Referring to FIG. 2, the graphics display architecture provided by the present invention at least comprises an AGP slot 210 having a plurality of first pins, a PCIE slot 220 having a plurality of second pins, and a control chip set 200 having a plurality of multi-defined pins. As shown in FIG. 2, the control chip set 200 is first coupled to the AGP slot, and then coupled to the PCIE slot 220. In other words, in the graphics display architecture of the preferred embodiment, the AGP slot 210 is located closer to the control chip set 200 than the PCIE slot 220 to the control chip set 200. More specifically, the multi-defined pins are coupled to the first pins of the AGP slot 210, and then coupled to the second pins of the PCIE slot 220 through the first pins. That is, the control chip set 200 uses a shared bus to connect to the AGP slot 210 and the PCIE slot 220 without requiring two separate buses to connect to the AGP slot 210 and the PCIE slot 220.

The AGP slot 210 serves to plug in graphics adapter (not shown), wherein the graphics adapter complies with the AGP interface specification, or the graphics chip in the graphics adapter should supports Gfx interface. Notice that the Gfx interface is a general naming for CRT signal interface, FD interface, TV in/out interface, TMDS interface, LVDS interface, and DVI interface. Thus the pins to the AGP slot 210 are redefined as Gfx interface signal pins for the graphics adapter supporting Gfx interface, whereas only mechanism (such as hardware configuration) complies with AGP interface specification. Similarly, since the PCIE slot 220 serves to plug in the graphics adapter (not shown), the graphics adapter is required to comply with PCIE interface specification.

When the graphics adapter that is complied with AGP interface specification is plugged in the AGP slot 210, the multi-defined pins of the control chip set 200 serve to send/receive data and control signals as well as displays via the AGP slot 210. Similarly, when the graphic adapter is plugged in the AGP slot 210 and the graphics adapter supports the Gfx interface, the multi-defined pins serve to send/receive the signal complied with the Gfx interface, so as to perform display via the AGP slot 210. When the graphics adapter complying with the PCIE interface specification is plugged in the PCIE slot 220, the multi-defined pins serve to send/receive the signal complied with the PCIE interface specification, so as to perform display via the PCIE slot 220.

In the graphics display architecture of the preferred embodiment shown in FIG. 2, the AGP slot 210 is located closer to the control chip set 200 than the PCIE slot 220 to the control chip set 200. The main reason is that the PCIE interface specification applies a differential method for signal transmission. The main concept of the so-called differential method is to transmit a signal with two signal lines. When a signal is transmitted on the first signal line, the signal transmitted on the other signal line is designated as a signal with an opposite level, i.e. provided the first signal line transmitting a "1" signal, the second signal line transmitting a "0" signal. Therefore, the signal transmission is error free, and the signal or data transmission error is easily identified when two signal lines are transmitting identical signals. Theoretically, PCIE interface specification manages to correctly transmit signals to locations farther than the AGP interface specification does. Therefore, the system manages to perform steadily even devices such as terminal resistors are omitted, thus cost of motherboard manufacturing is reduced accordingly.

It will be apparent to one of the ordinary skilled in the art that except specifically mentioned, AGP interface specification of the present invention includes 1× mode, 2× mode, 4× mode, and 8× mode, or relevant AGP interface specification under different operating voltages. The AGP slot may be a shared AGP slot for various multiplying modes or operating voltages.

Figure 3:
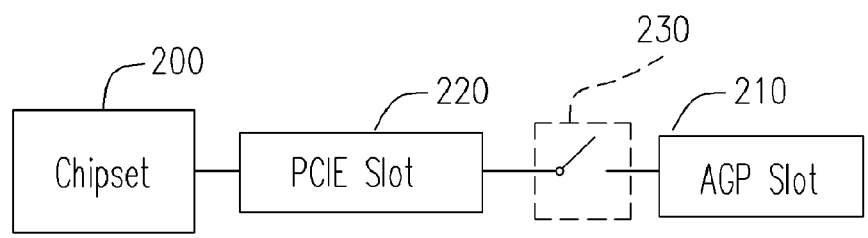
FIG. 3 is a schematic view of a graphics display architecture in the PC motherboard of another preferred embodiment according to the present invention.

FIG. 3 is a schematic view of a graphics display architecture in the PC motherboard of another preferred embodiment according to the present invention. The detail of similarity to the foregoing preferred embodiment omitted herein. Referring to FIG. 3, the first difference between the present preferred embodiment and the preferred embodiment shown in FIG. 2 is the connections among the control chip set 200, the PCIE slot 220, and the AGP slot 210. Another difference is that the graphics display architecture of the present preferred embodiment further comprises a switch set 230 that is electrically coupled to the second pin of the PCIE slot 220 at one end and to the first pin of the AGP slot 210 at the other end. In summary, the relative location of electrical connections of the present preferred embodiment follows a sequence of: the control chip set 200, the PCIE slot 220, the switch set 230, and the AGP slot 210.

In the present preferred embodiment, the PCIE slot 220 is located closer to the control chip set 200 than the AGP slot 210 to the control chip set 200. As the graphics adapter is plugged in the PCIE slot 220, meaning the multi-defined pins of the control chip set 200 serves to send/receive signals complied with the PCIE interface specification, the switch set 230 is open in order to disconnect signal wiring to subsequent AGP slot 210. Thus signals that are complied with the PCIE interface specification are ensured to transmit steadily. It will be apparent to one of the ordinary skilled in the art that in order to provide more stable signals, the switch set 230 may include terminal resistors, for example.

Figure 4:
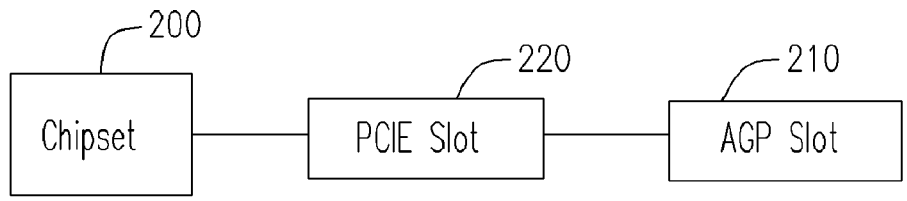
FIG. 4 is a schematic view of a graphics display architecture in the PC motherboard of yet another preferred embodiment according to the present invention.

FIG. 4 is a schematic view of a graphics display architecture on a PC motherboard according to yet another preferred embodiment in the present invention. Referring to FIG. 4, the difference between the present preferred embodiment and the preferred embodiment shown in FIG. 3 is that the switch set 230 is omitted herein. The reason is that the system is still steadily operated even the switch set 230 is omitted if parts are properly selected and layout is carefully designed, thus the manufacturing cost is further reduced accordingly.

Figure 5:
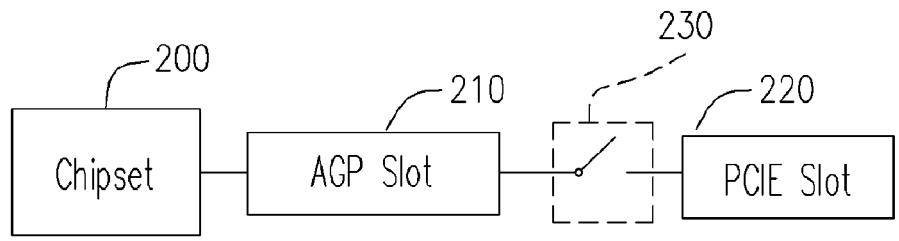
FIG. 5 is a schematic view of a graphics display architecture in the PC motherboard of yet another preferred embodiment according to the present invention.

FIG. 5 is a schematic view of a graphics display architecture in the PC motherboard of yet another preferred embodiment according to the present invention. Referring to FIG. 5, the difference between the present embodiment and the preferred embodiment shown in FIG. 2 is that the switch set 230 is additionally added, such that the system operates more steadily.

It is another aspect of the present invention to provide a graphics display architecture, in which the AGP slot dose not support both the interface specifications. It is considered within the scope of the present invention as long as the AGP slot either complies with the AGP interface specification or supports the Gfx interface, or even supports other interface specification related to graphics display. Accordingly, the control chip set should support both the PCIE interface specification and another type of interface specification.

Figure 6:
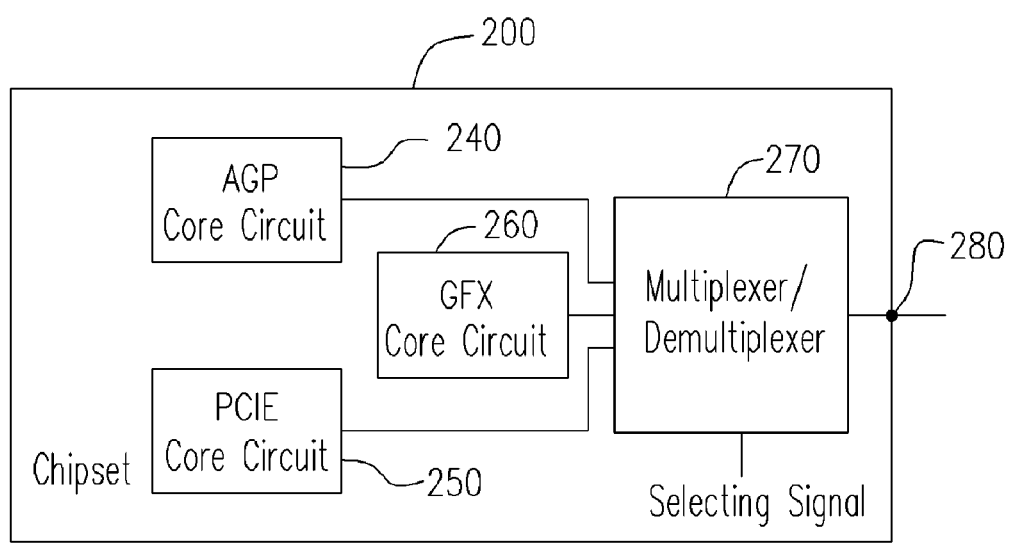
FIG. 6 is a schematic block diagram of a control chip set in a graphics display architecture of one preferred embodiment according to the present invention.

FIG. 6 is a schematic block diagram of a control chip set in a graphics display architecture of a preferred embodiment according to the present invention. Referring to FIG. 6, the control chip set 200 is suitable for graphics display architecture of various preferred embodiments, which comprises an AGP core circuit 240, a PCIE core circuit 250, a Gfx core circuit 260, a plurality of multi-defined pins 280, and a multiplexor/demultiplexor 270.

The AGP core circuit 240 provided by the present invention controls and serves to sends/receives signals complied with the AGP interface specification, and the PCIE core circuit 250 controls and serves to sends/receives signals complied with the PCIE interface specification. Similarly, the Gfx core circuit 260 controls and serves to sends/receives signals complied with the Gfx interface specification. The multiplexor/demultiplexor 270 is electrically coupled to the AGP core circuit 240, the PCIE core circuit 250, the Gfx core circuit 260, and the multi-defined pins 280. The scheme either transmits one signal selected from the AGP core circuit 240, the PCIE core circuit 250, or the Gfx core circuit 260 to multi-defined pins 280 under selection of the selecting signal. Or, it transmits the signal of the multi-defined pins 280 to one of the AGP core circuit 240, the PCIE core circuit 250, and the Gfx core circuit 260 that is selected.

The selection signal mentioned above is set up according to hardware like a pull-up resistor or a pull-down resistor, i.e. it is set up with a strapping method, or with a programmable BIOS. Optionally, the output signal of the multiplexor/demultiplexor 270 designated as one of the AGP core circuit 240, the PCIE core circuit 250, and the Gfx core circuit 260 with IC bonding wire method.

In summary, the control chip set of the present invention uses a plurality of multi-defined pins to support the AGP interface specification, the PCIE interface specification, and the Gfx interface simultaneously. Accordingly, in the graphics display architecture of the present invention, the multi-defined pins are coupled to both the AGP slot and the PCIE slot in order to support multiple interface specifications of graphics display on a sole motherboard. Therefore, the present invention simplifies circuit design, and eliminates complication of version control and inventory control.

Although the invention has been described with reference to a particular preferred embodiment thereof, it will be apparent to one of the ordinary skilled in the art that modifications to the described preferred embodiment may be made without departing from the spirit of the invention. Accordingly, the scope of the invention will be defined by the attached claims not by the above detailed description.

The invention claimed is:
1. A graphics display architecture, comprising:
an Accelerated Graphics Port (AGP) slot;

a Peripheral Component Interconnection Express (PCIE) slot; and a control chip set, electrically coupled to both the AGP slot and the PCIE slot;

wherein said control chip set uses a shared bus to connect said AGP slot and said PCIE slot and serves to send/receive a signal complied with an AGP interface specification as an AGP graphics adapter is plugged in the AGP slot, said control chip set serves to send/receive the signal complied with a Gfx interface specification as a Graphics (Gfx) adapter is plugged in the AGP slot, and said control chip set serves to send/receive the signal complied with a PCIE interface specification as a PCIE graphics adapter is plugged in the PCIE slot.

2. The graphics display architecture of claim 1, wherein electrical connection wise, said AGP slot is located relatively closer to said control chip set than said PCIE slot to said control chip set.

3. The graphics display architecture of claim 1, further comprising a switch set, wherein one end of said switch set is coupled to said PCIE slot, and the other end of said switch set is coupled to said AGP slot.

4. The graphics display architecture of claim 3, wherein electrical connection wise, the relative location follows a sequence of said control chip set, said PCIE slot, said switch set, and said AGP slot.

5. The graphics display architecture of claim 1, wherein said Gfx interface comprises a Low Voltage Differential Signaling (LVDS) interface, and a Digital Visual Interface (DVI).

6. The graphics display architecture of claim 1, wherein said AGP slot is a shared AGP slot.

7. A graphics display architecture, comprising:
a first graphics adapter slot;
a second graphics adapter slot; and
a control chip set, electrically coupled to both the first graphics adapter slot and the second graphics adapter slot, wherein said control chip set comprising a plurality of multi-defined pins connects to pins of said first graphics adapter slot and pins of said second graphics adapter slot with a shared bus, and said control chip set uses a shared bus to connect an AGP slot and a PCIE slot and serves to send/receive a signal complied with said first graphics adapter as a first graphics adapter is plugged in said first graphics adapter slot, and said control chip set serves to send/receive a signal complied with said second graphics adapter as a second graphics adapter is plugged in said second graphics adapter slot.

8. The graphics display architecture of claim 7, wherein said first graphics adapter slot is an AP slot.

9. The graphics display architecture of claim 7, wherein said first graphics adapter slot is a Graphics (Gfx) interface slot.

10. The graphics display architecture of claim 9, wherein said Gfx interface slot supports a Low Voltage Differential Signaling (LVDS) interface and a Digital Visual Interface (DVI).

11. The graphics display architecture of claim 7, wherein electrical connection wise, said first graphics adapter slot is located relatively closer to said control chip set than said second graphics adapter slot to said control chip set.

12. The graphics display architecture of claim 11, wherein said first graphics adapter slot is an AGP slot, and said second graphics adapter slot is a PCIE slot.

13. The graphics display architecture of claim 11, wherein said first graphics adapter slot is a Gfx interface slot, and said second graphics adapter slot is a PCIE slot.

14. The graphics display architecture of claim 11, wherein said first graphics adapter slot is a PCIE slot, and said second graphics adapter slot is an AGP slot.

15. The graphics display architecture of claim 11, wherein said first graphics adapter slot is a PCIE slot, and said second graphics adapter slot is a Gfx interface slot.

16. The graphics display architecture of claim 7, further comprising a switch set, wherein one end of the switch set is coupled to said first graphics adapter slot, and said other end of the switch set is coupled to said second graphics adapter slot.

17. The graphics display architecture of claim 16, wherein electrical connection wise, said relative location follows a sequence of said control chip set, said first graphics adapter slot, said switch set, and said second graphics adapter slot.

18. A control chip set with a plurality of multi-defined pins and suitable for a graphics display architecture, comprising:
an AGP core circuit for controlling and sending/receiving a signal complied with an AGP interface specification;
a PCIE core circuit, for controlling and sending/receiving a signal complied with a PCIE interface specification;
a Graphics (Gfx) core circuit, for controlling and sending/receiving a signal complied with a Gfx interface specification; and
a multiplexor/demultiplexor, coupled to said AGP core circuit, said PCIE core circuit, and said Gfx core circuit, and said multiplexor/demultiplexor selectively either transmitting a signal from one of said AGP core circuit, said PCIE core circuit, and said Gfx core circuit to a plurality of multi-defined pins or transmitting a signal of the multi-defined pins to one of said AGP core circuit, said PCIE core circuit, and said Gfx core circuit.

19. The control chip set of claim 18, said graphics display architecture further comprising a shared AGP slot and a PCIE slot,
wherein said control chip set serves to send/receive a signal complied with said AGP graphics adapter as an AGP graphics adapter is plugged in said shared AGP slot, said multi-defined pins serves to send/receive a signal complied with said Gfx interface as a graphics adapter complying with a Gfx interface is plugged in said shared AGP slot, and said control chip set serves to send/receive a signal complied with a PCIE interface specification as a PCIE graphics adapter is plugged in said PCIE slot.

* * * * *